United States Patent
Wadleigh

[11] Patent Number: 6,088,714
[45] Date of Patent: Jul. 11, 2000

[54] MECHANISM FOR CALCULATING ONE-DIMENSIONAL FAST FOURIER TRANSFORMS

[75] Inventor: Kevin R. Wadleigh, Plano, Tex.

[73] Assignee: Agilent Technologies, Palo Alto, Calif.

[21] Appl. No.: 09/123,241

[22] Filed: Jul. 27, 1998

[51] Int. Cl.[7] .................................................. G06F 15/00
[52] U.S. Cl. ............................................................ 708/404
[58] Field of Search ..................................... 708/400, 401, 708/402, 403, 404, 405, 406, 407, 408, 409

[56] References Cited

U.S. PATENT DOCUMENTS

| | | | |
|---|---|---|---|
| 4,821,224 | 4/1989 | Liu et al. ................................ | 708/401 |
| 4,977,533 | 12/1990 | Miyabayashi et al. ................. | 708/404 |
| 5,034,910 | 7/1991 | Whelchel et al. ..................... | 708/407 |
| 5,233,551 | 8/1993 | White ..................................... | 708/408 |
| 5,751,616 | 5/1998 | Hegland et al. ....................... | 708/401 |
| 5,968,112 | 10/1999 | Kirschenbaum et al. ............. | 708/405 |

*Primary Examiner*—Chuong Dinh Ngo

[57] ABSTRACT

The inventive mechanism uses seven steps to perform the mathematic equivalent to performing one large FFT on the input data. The input data array is decomposed into a plurality of squares. In first step, each of the squares has their respective points swapped across their main diagonals. In the second step, small FFTs are calculated for each of the squares. In the third step, the data is transposed in each of the squares as the first step. In fourth step, the data is oriented into a column format, which are multiplied by the twiddle coefficients. In the fifth step 75, small column oriented FFTs are calculated. The results of each of steps 4 and 5 is in a work array which is small enough to remain in cache. In the sixth step, columns data are transposed and stored into a columns of the squares. In the seventh step, the data is transposed in each of the squares as the first and third steps. This mechanism reduces cache misses, and allows for parallel processing.

51 Claims, 4 Drawing Sheets

| | | DATA MOVEMENT | MISSES | PARALLEL THREADS |
|---|---|---|---|---|
| 71— STEP 1 | TRANSPOSE WITHIN SQUARES | X TO X | 2 | s |
| 72— STEP 2 | s*t FFTs OF LENGTH t | X | 2 | s |
| 73— STEP 3 | TRANSPOSE WITHIN SQUARES | X TO X | 2 | s |
| 74— STEP 4 | TWIDDLE MULTIPLY | U*X TO y | 2 | t |
| 75— STEP 5 | t FFTs OF LENGTH s*t | y | 0 | t |
| 76— STEP 6 | TRANSPOSE WITHIN COLUMNS | y TO X | 1 | t |
| 77— STEP 7 | TRANSPOSE WITHIN SQUARES | X TO X | 2 | s |
| | TOTAL (ASSUMES y STAYS IN CACHE) | | 11 | |

|  |  |  | DATA MOVEMENT | MISSES |
|---|---|---|---|---|
| 10 — STEP 1 | TRANSPOSE |  | X TO Y | 3 |
| 13 — STEP 2 | m COLUMN FFTs OF LENGTH k |  | Y | 2 |
| 14 — STEP 3 | TRANSPOSE |  | Y TO X | 3 |
| 15 — STEP 4 | TWIDDLE MULTIPLY |  | U*X TO Y | 4 |
| 17 — STEP 5 | k COLUMN FFTs OF LENGTH m |  | Y | 2 |
| 18 — STEP 6 | TRANSPOSE |  | Y TO X | 3 |
|  | TOTAL |  |  | 17 |

FIG. 4

|  |  |  | DATA MOVEMENT | MISSES |
|---|---|---|---|---|
| 10 — STEP 1 | TRANSPOSE |  | X TO X | 2 |
| 13 — STEP 2 | m COLUMN FFTs OF LENGTH k |  | X | 2 |
| 14 — STEP 3 | TRANSPOSE |  | X TO X | 2 |
| 15 — STEP 4 | TWIDDLE MULTIPLY |  | U*X TO X | 3 |
| 17 — STEP 5 | k COLUMN FFTs OF LENGTH m |  | X | 2 |
| 18 — STEP 6 | TRANSPOSE |  | X TO X | 2 |
|  | TOTAL |  |  | 13 |

FIG. 5

FIG. 6 s SQUARES

FIG. 7A s SQUARES

71 STEP 1: TRANSPOSE WITHIN SQUARES

72 STEP 2: t FFTs OF LENGTH t FOR EACH SQUARE

73 STEP 3: TRANSPOSE WITHIN SQUARES

| | | DATA MOVEMENT | MISSES | PARALLEL THREADS |
|---|---|---|---|---|
| 71 — STEP 1 | TRANSPOSE WITHIN SQUARES | X TO X | 2 | s |
| 72 — STEP 2 | s*t FFTs OF LENGTH t | X | 2 | s |
| 73 — STEP 3 | TRANSPOSE WITHIN SQUARES | X TO X | 2 | s |
| 74 — STEP 4 | TWIDDLE MULTIPLY | U*X TO y | 2 | t |
| 75 — STEP 5 | t FFTs OF LENGTH s*t | y | 0 | t |
| 76 — STEP 6 | TRANSPOSE WITHIN COLUMNS | y TO X | 1 | t |
| 77 — STEP 7 | TRANSPOSE WITHIN SQUARES | X TO X | 2 | s |
| | TOTAL (ASSUMES y STAYS IN CACHE) | | 11 | |

FIG. 9

MECHANISM FOR CALCULATING ONE-DIMENSIONAL FAST FOURIER TRANSFORMS

BACKGROUND OF THE INVENTION

In the last decade, many applications optimized for vector computers have moved to microprocessor based computers or MCs. The reason for the move is two-fold: microprocessors are cheap and the peak performance of the fastest microprocessor is converging to the peak performance of the fastest vector processor. However, obtaining a speed close to the peak speed for large applications on MCs can be difficult. Vector computer memory systems are designed to deliver one or more elements to the vector registers per clock period, while MCs are not designed to deliver as much bandwidth from their memory systems. Instead, the MCs rely on data caches to allow fast access to the most recently used data. Applications that have a very high reuse of the data in cache run well. For problems that have low data reuse, the performance is typically soley determined by the ability of the processor to load data from memory. Consequently, the goal for most algorithms is to access the memory system as infrequently as possible.

The fast Fourier transform (FFT) is an efficient way to calculate power-of-two one-dimensional discrete Fourier transforms (DFT). The FFT is described in the article by Cooley, J. W., and Tukey, J. W, entitled "An algorithm for the machine calculation of complex Fourier series", Math. Comp., 19: 297–301 1965, which is hereby incorporated by reference. Different algorithms are needed depending upon whether the datasets fit in cache. For datasets that are cache resident, the algorithms that have been developed for vector computers frequently work well in MC systems. This is because the cache on many microprocessors can deliver more bandwidth than their floating-point functional units can consume. This is similar to the case for vector computers. For example, the Stockham based algorithm, as described in the article by Cochrane et al., entitled "What is the fast Fourier transform?", IEEE Trans. Audio and Electroacoustics, AU-15: 45–55, 1967, which is hereby incorporated by reference, works well in this situation. Other variants of the Stockham algorithm exist, as well as other types of vector computer algorithms exist. These types of techniques work well for datasets that fit in cache.

However, when a problem exceeds cache size, the performance of Stockham based or other vector algorithms decreases dramatically in MCs. Consequently, one goal for large FFTs is to minimize the number of cache misses. Prior art techniques have attempted to reduce cache misses, such as the four-step and six-step approaches as described in the article by Bailey, D, entitled "FFTs in External or Hierarchical Memory", in The J. Supercomputing, 4: 23–35, 1990, which is hereby incorporated by reference. Other variants of these approaches exist. The basic four-step approach is composed of row simultaneous FFTs, a transpose, and a twiddle multiply. The basic six-step approach is composed of column simultaneous FFTs, three transposes, and a twiddle multiply. Although the six-step approach requires three data transposes, each column FFT may fit in the data cache.

One formulation of the six-step approach takes an input array X of size n=k×m, a work array Y of size n, and an array of roots of unity (twiddle factors) U of size n and comprises the following steps.

1. transpose X(k, m) to Y(m, k).
2. k simultaneous FFTs of length m using Y.
3. transpose Y(m, k) to X(k, m).
4. twiddle factor multiply U(k,m)×X(k,m)=Y(k,m).
5. m simultaneous FFTs of length k using Y.
6. transpose Y(k, m) to X(m, k).

Although the individual FFTs may fit in cache, many misses may occur in the other steps, however the number of misses is lower than the Stockham based FFTs. Note that the FFT steps are short, one-dimensional contiguous FFTs. Steps 1 through 6 together are mathematically equivalent to performing one large FFT on the input data in array X of size n.

Figure 1:
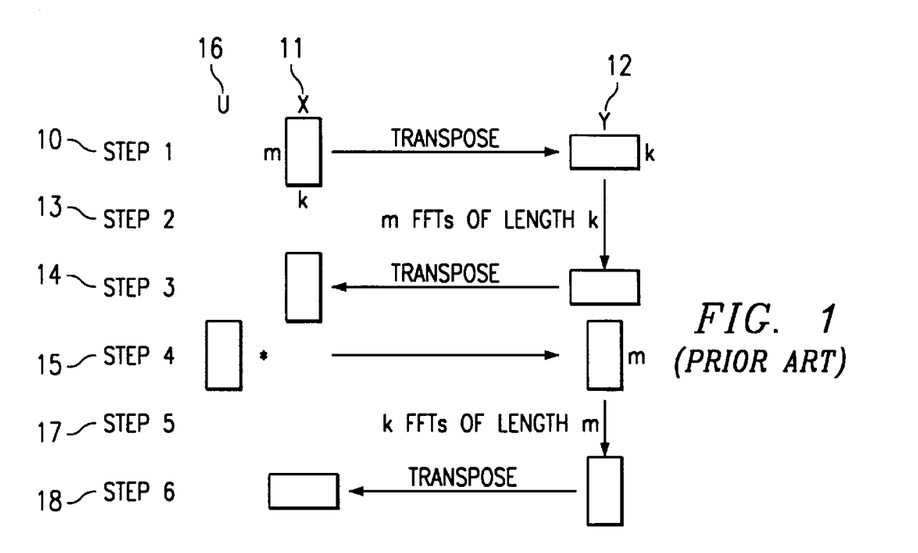
FIG. 1 depicts the prior art FFT mechanism.

FIG. 1 graphically depicts the data movement on the six-step algorithm. The input is the vector X 11, which is represented as an array of size n which equals m×k. The first step 10 transposes the data in array X 11 into a work array Y 12 also of size n. Thus, the data in position i,j of array X 11, becomes the data of the position j,i of array Y 12. The transposition is performed so that the data will have better cache characteristics, i.e. the data in the cache is more likely to be reused. The second step 13 performs m short, one-dimensional contiguous FFTs, each of length k, on the data in array Y 12. Note that the size of the FFTs is k. Further note that short FFTs are usually about the square root in size of the original problem, and thus, more likely to fit into cache. The third step 14 transposes the data back from array Y 12 to array X 11. The fourth step 15 multiples the X array by the coefficients of array U 16, which has a size n, and stores the results into the work array Y 12. The array U 16 comprises the twiddle factors, which are previously calculated trigometric coefficients that are used for scaling. Note that in steps 4 through 6, the work array Y 12 is considered to be a k×m array, instead of a m×k array as in steps 1 through 3. This ensures that the step 5 FFTs are contiguous in memory. The fifth step 17 performs k FFTs, each of length m, similar to step 2, on the data stored in array Y. To complete the transform, the sixth step 18 transposes the data back into array X 11 from array Y 12. This implies that in step 6, the array X 11 is considered to be a m×k array, instead of a k×m array as in steps 1 through 3.

Figure 2:
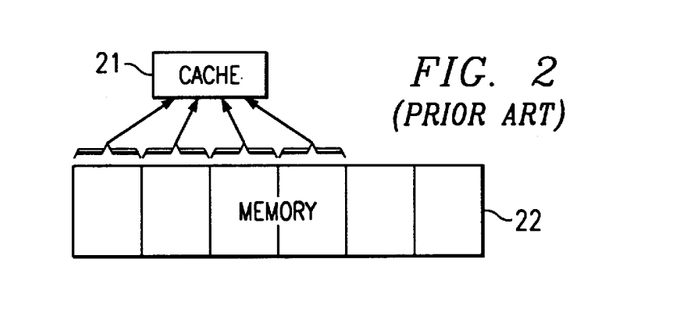
FIG. 2 depicts relationships of the cache and the memory.
Figure 3:
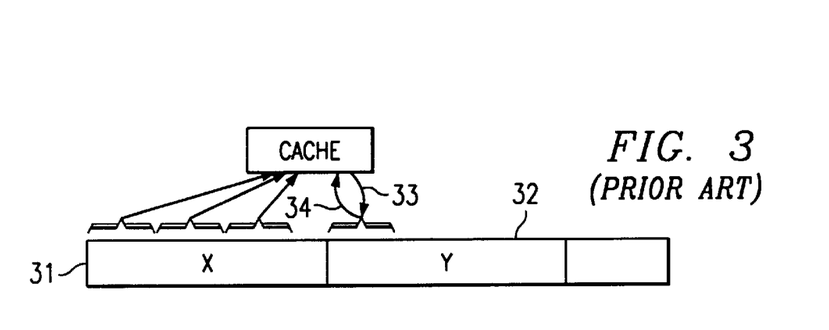
FIG. 3 depicts the relationships of the cache and the memory when a data block is larger than the cache.

Since X 11, Y 12, and U 16 are all size n, and all will be stored into cache from the memory, then cache misses would only typically occur when n is greater than ⅓ of the cache size. FIG. 2 depicts typical size relationships of cache 21 and memory 22, where the memory 22 is shown to be much larger than the cache 21. Each block of data in the memory is the same size or larger than the cache, thus as additional blocks of data are loaded into cache, the prior data is overwritten. Each time a block of data is loaded into cache, cache misses occur. These cache misses are required as data must be moved from the memory and into cache. FIG. 3 depicts the size relationships between the cache 21 and the memory 22, however, the data blocks X 31 and Y 32 are larger than the cache. Therefore, as each portion of the block X 31 is loaded into memory, cache misses are accrued from the data movement. Note that cache misses occur when data is moved from memory to cache, as well as cache to memory. Typically, when data is stored, the data must first be loaded from memory to cache, and then stored back to the memory, thus accruing double the misses that a load accrues, as two data movements have occurred. For example, in storing data to Y 32, the cache first loads 34 the data into cache, and then stores 33 the data back into memory. Therefore, the mechanism of FIG. 1 will incur many cache misses if the size of n exceeds ⅓ the size of the cache, since the mechanism of FIG. 1 uses three arrays, X, Y, and U, all of size n.

Therefore, there is a need in the art for a FFT mechanism that reduces the number of cache misses that occur when the data block is larger ⅓ of the size of the cache.

SUMMARY OF THE INVENTION

These and other objects, features and technical advantages are achieved by a system and method which prior to calculating the FFT, decomposes the input data array in a plurality of squares, and then manipulates the data within the squares and within columns of the input array.

The inventive mechanism modifies the prior art six step approach into a seven step approach. The seven steps, taken as a whole, are mathematically equivalent to performing one large FFT on the input data. The input data X of size n is treated as s squares of size txt, such that $n=s \times t^2$. In first step, each of the s squares of size txt is treated separately, and their respective points are swapped across their main diagonals, i.e. the data at point i,j is exchanged for the data at the point j,i, for each square. In the second step, t FFTs, each of length t is calculated for each of the squares, for a total of sxt FFTs. The results are stored back into their respective locations. In the third step, the data is transposed in each of the squares as the first step. In fourth step, the s squares are multiplied by the twiddle coefficients of array U, which has a size $n=s \times t^2$. In the fifth step 75, t FFTs of length sxt are calculated. In steps 4 and 5, the s squares 61 and the array U 78 are viewed as comprising t one dimensional arrays of size sxt. The results of each of steps 4 and 5 are stored into a work array y, which has a size of sxt, and is small enough to remain in cache. In the sixth step, columns of y data are transposed and stored into columns of array X. In the seventh step, the data is transposed in each of the squares as the first and third steps.

Treating the data as squares allows the results of the transposition steps and the twiddle step, i.e. steps 1, 3–4, and 7, to be stored back onto the same memory location. This eliminates the need for a large work array which has a size equivalent to the input array. Since the large work array is not used, then cache misses occurring from loading and storing the work array do not occur. By using a small work array y in steps 4–6, which remains in cache, additional cache misses are saved.

The inventive mechanism allows for parallel processing of the different steps. Parallel threads can simultaneously process the different data structures. In steps 1–3 and 7, s threads can separately process each square. In steps 4–6, t threads can separately process each column or one dimensional array.

Therefore, it is a technical advantage of the present invention to calculate the FFT of a large input problem with fewer cache misses.

It is another technical advantage of the present invention that the memory requirements for calculating the FFT are reduced.

It is a further technical advantage of the present invention that the various operations of the invention can be parallel processed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 depicts the normalized cache misses for the inventive mechanism of

FIGS. 7A–7C; and

DETAILED DESCRIPTION OF THE INVENTION

As previously stated, the mechanism of FIG. 1 incurs many cache misses when n exceeds ⅓ of the cache size. The exact number of cache misses depends upon cache line size and other factors that are system dependant. A convenient mechanism to compare the number of misses is to normalize cache misses. Thus, a normalized cache miss is defined as follows:

normalized miss=n×bytes per point/cache line size, wherein a point is a point i,j in the input array.

Figure 4:
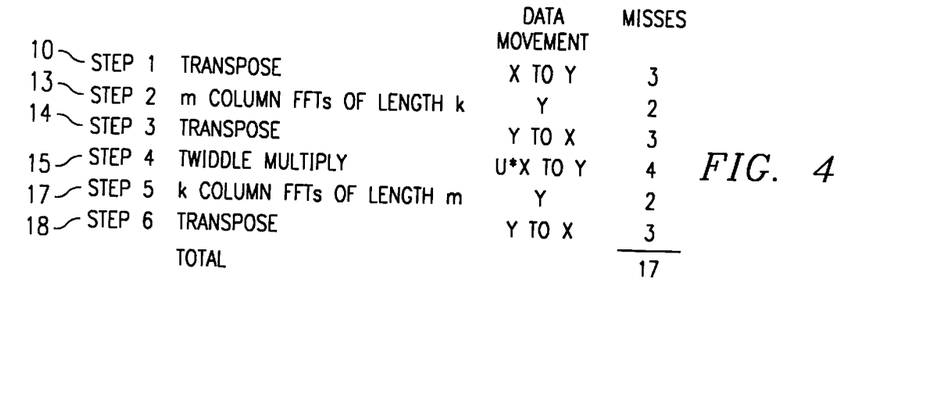
FIG. 4 depicts the normalized cache misses for the mechanism of FIG. 1.

Thus, when a load occurs and the data is not in cache, the cache misses and the data and must be loaded or read from memory, resulting in one normalized miss. When a store occurs and the data is not in cache, there are two normalized misses, one miss to read or load the data from memory into cache, and one miss to write or store the new data back to memory (this is also referred to as write-back). Thus, using 1 miss for loads and 2 misses for stores results in the six-step approach causing 17 misses, as shown in FIG. 4. Steps 1, 3, and 6 require moving data between memory locations, each of these steps causes three misses, one miss from a load of the data from X, and 2 misses from a store of the data to Y (Note that data cannot be stored until it has first been loaded). Steps 2 and 5 require the storing of data into Y, and thus each step incurs two misses. Step 4 incurs four misses, one from loading X, one from loading U, and two for storing into Y.

Figure 5:
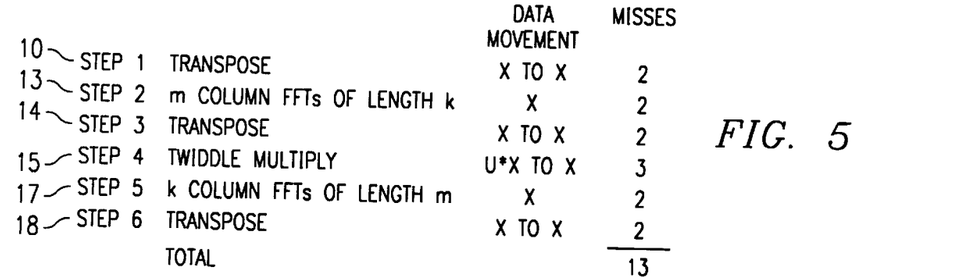
FIG. 5 depicts the normalized cache misses for an aspect of the invention.

The first aspect of the invention is that if X can be transposed onto itself, then Y is not needed. This will cause fewer misses than the mechanism of FIG. 1. This will also reduce the memory space requirements by a third, as only two arrays will be stored, i.e. X and U. Moreover, this changes the cache requirements as only the two equal sized arrays, X and U, will need to fit into cache. Note that each transpose would only incur 2 misses instead of three misses, since the store of X has been preceded by a load of X. This can occur when X is a square, i.e. m×m. Thus, the transposition involves the exchange of two points, i,j with j,i. FIG. 5 depicts the data movement and cache misses when the Y array is eliminated. Note that step 4 saves a cache miss as the additional load is not required. Thus, by eliminating the Y array, a total of 13 cache misses occur, which is a savings of 4 cache misses over the mechanism of FIG. 1. However, note that the steps 1 through 6 together are mathematically equivalent to performing one large FFT on the input data in array X of size n.

The transposition of a square X or n, assuming a size of s×s, only requires swapping diagonals across the main diagonal, shown as follows.

```
complex X(s, s)
do j=1, s-1
   do i=1, j
      temp=X(n-j+i, i)
      X(n-j+i, i)=X(i, n-j+i)
      X(i, n-j+i)=temp
   enddo
enddo
```

Note that the work array Y is not required. This transpose may be blocked for good cache line reuse. The six-step approach of FIG. 1 is performed with $X_{i,j}$ being overwritten in each step. This will achieve the cache miss savings as shown in FIG. 5.

However, not all inputs X or n are square, many are multiples of powers of 2, 3, and 5. However, all large numbers that are multiples of powers of 2, 3, and 5 can be decomposed into a plurality of squares. Thus, the elimination of the Y array can be generalized for all inputs having such powers. Note that if the powers of 2, 3, and 5 are small, i.e. 0 or 1, then the resulting n is small, i.e. 1, 2, 3, 5, 6, 10, 15, or 30. These small n will typically fit into the cache, and thus will not incur misses from data movements to and from memory. The FFT can be calculated in a single step. All other n can be written as $n=2^{2k+p} \times 3^{21+q} \times 5^{2m+r}$, wherein $0 \leq p,q,r \leq 1$ and at least one of the powers is >1.

Assume for the remainder of this disclosure that the power of 2 is greater than 1, i.e. $2k+p>1$. Note that either the power of 3 or 5 could be greater than 1, in which case that particular power would used to form the squares. If more than one of 2, 3, and 5 has a power greater than one, then the mechanism would select which of 2, 3, and 5 would be used to form squares.

Figure 6:
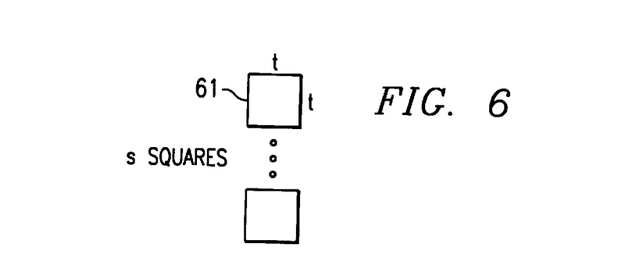
FIG. 6 depicts the decomposition of the input data into squares.

As stated above, non-square rectangles can be decomposed into a plurality of squares. Thus, s squares, with each square being t×t can be formed from input n, with $s=2^p \times 3^{21+q} \times 5^{2m+r}$ and $t=2^k$. Note that $n=s \times t^2$. This is depicted in FIG. 6 with s squares 61, each sized t×t. Note that the decomposition does not involve any data movement, and thus does not incur any cache misses.

Figure 7A:
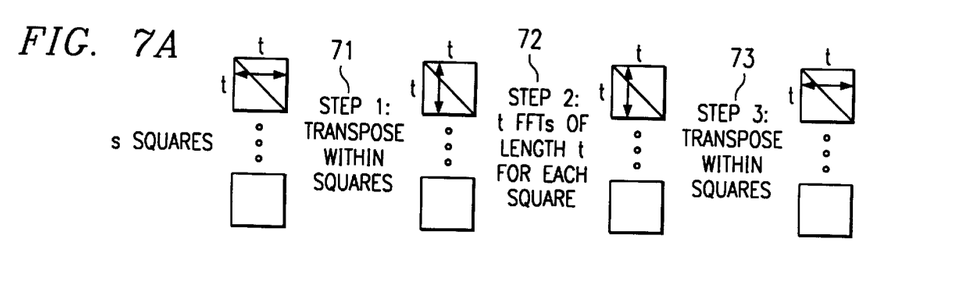
FIGS. 7A–7C depict the seven steps of the inventive FFT mechanism.
Figure 7B:
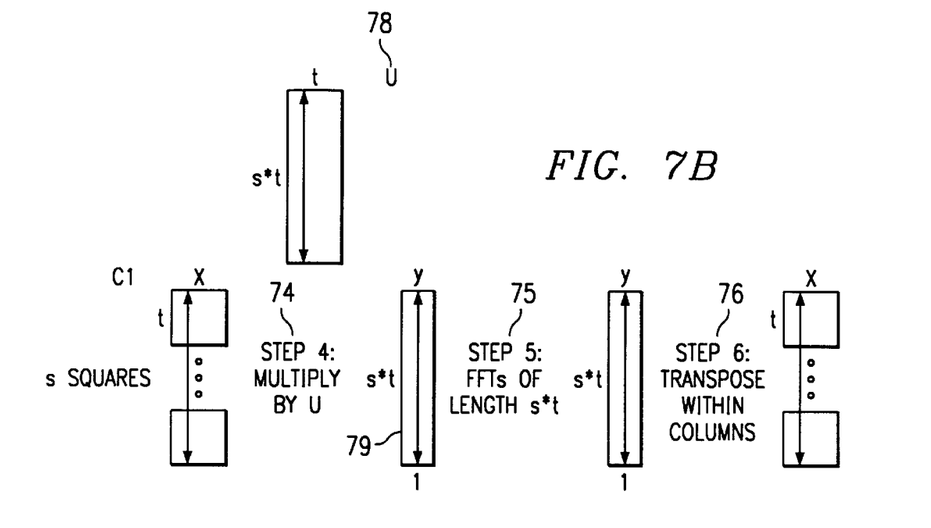
Figure 7C:
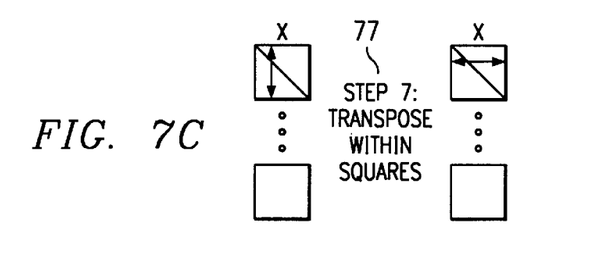

FIGS. 7A–7C depict the seven steps of the inventive FFT mechanism. The seven steps together are mathematically equivalent to performing one large FFT on the input data in array X of size n. Note that since there is not a main diagonal as in the n=m×m case, points cannot be swapped as before. However, the transposes in steps 1 and 3 do not need to be complete transposes. The only requirement is that the data needed for the individual step 2 FFTs be in the same order as step 2 of the six step approach. Thus, in the first step 71, each of the squares is treated separately, and their respective points are swapped across their main diagonals, i.e. the data at point i,j is exchanged for the data at the point j,i, for each square. Each of the transposed squares is stored over itself. In the second step 72, t FFTs, each of length t is calculated for each of the s squares, for a total of s×t FFTs. The results are stored back into their respective locations. In the third step 73, the data is transposed in each of the squares as the first step 71. At the conclusion of the third step the data is back in proper order for the remaining steps.

In fourth step 74, the s squares are multiplied by the coefficients of array U 78, which has a size $n=s \times t^2$. The array U comprises twiddle factors, as discussed with regard to FIG. 1. In the fifth step 75, t FFTs of length s×t are calculated.

The sixth step 76 and the seventh step 77 together form a complete transposition. The goal is to transpose $X(s \times y_1, Y_2)$ to $X(y_2, s \times y_1)$, wherein $y_1$, $y_2$ equal t. If the data is treated as three dimensional arrays, then the data $X(y_1, s, y_2)$ must be transposed to $X(y_2, s, y_1)$. This transpose may be achieved by:

complex $X(y_1, s, y_2)$;

transpose $X((y_1, s), y_2)$ to $X((s, y_1), y_2)$; and transpose $X((s, y_1), Y_2)$ to $X(y_2, (s, y_1))$.

The first transpose or step 6, operates on a column of data at a time. Once all the columns have been transposed, the second transpose or step 7 is performed. This part is the same operation as the partial transposes of steps one and three. This completes the transform.

In step 4, note that the s squares 61 and the array U 78 can be viewed as comprising t one dimensional arrays of size s×t. Thus, each of the multiplications of one array from the squares and one array of the array U would be stored into a work array y, which has a size of s×t. Note that for comparison, the large Y array used in the mechanism of FIG. 1 would have a size of $s \times t^2$. Thus, in the fourth step 74, a column from array U 78 is multiplied with a respective column from the array X, i.e. one column from all of the squares. This result is then stored in working array y 79. Note that array y 79 is usually smaller than cache, and should stay within the cache during further processing. In the fifth step 75, a FFT is performed on the data in the array y 79. The FFT has a length of s×t. Note that no cache misses will occur, because the data is already loaded into cache. Steps 4 and 5 will be performed t times, with t one dimensional arrays.

In the sixth step 76, columns of data are transposed. At the conclusion of step 5, data is in the y array. Each transposition reads the data from y and writes into a column of array X, such that upon completion of the last one dimensional array, the data is ready for step 7. Since the array y has been used in steps 4 and 5, then the array y is already in cache, then a cache miss does not occur for loading or storing y. However, a cache miss does occur for storing the result into X. Note that there is only one cache miss for the store because the load occurred in step 4. The transposition involves treating the vector y as an array y(y1,s) and transposing it to X((s, y1),y2), where it is stored in $X_j$. In the seventh step 77, the data is transposed in each of the squares as the first step 71 and the third step 73.

Figure 8:
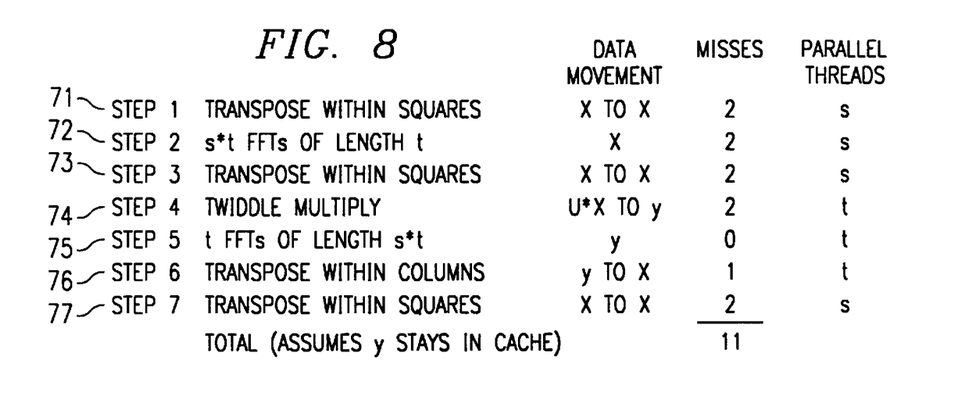

FIG. 8 depicts the cache misses associated with the mechanism of FIGS. 7A–7C. As compared with FIG. 5, note that splitting the sixth step into two steps, has added a cache miss. However, by using the one dimensional array y, the number of cache misses has been reduced in the twiddle multiple step and the subsequent FFT step, for a overall reduction in cache misses by two, for a total of 11 cache misses.

The inventive mechanism of FIGS. 7A–7C also allows for parallelism or parallel processing of the different steps. As shown in FIG. 8, parallel threads can simultaneously process the different data structures. In steps 1–3 and 7, s threads can separately process each square. The processing of each square is independent of the others. In steps 4–6, t threads can separately process each column or one dimensional array. The processing of each column is independent of the others. Note that problems which fit into a cache should not be run in parallel as cache misses could occur and reduce performance.

Parallelism also depends upon the number of processors. For example, suppose there are z processors. The problem should be decomposed into at least z squares. If s and t are defined such that n=s×t×t, then the granularity of parallelism in steps 1–3 and step 7 is s, and the granularity of parallelism in steps 4–6 is t. For efficient parallelism z≦s,t. This is met for large n. It can be shown that for z≦16 and 31,000≦n there are always s, t such that z≦s,t. For example, if zk=16 and n=468,750=2×3×$5^7$, the data can be partitioned as 30 squares of size 125. This gives 30 way parallelism in steps 1–3 and step 7, and 125 way parallelism in steps 4–6. To maximize the performance of the serial components of the parallel decomposition, the minimum s subject to the above constraints should be selected.

Figure 9:
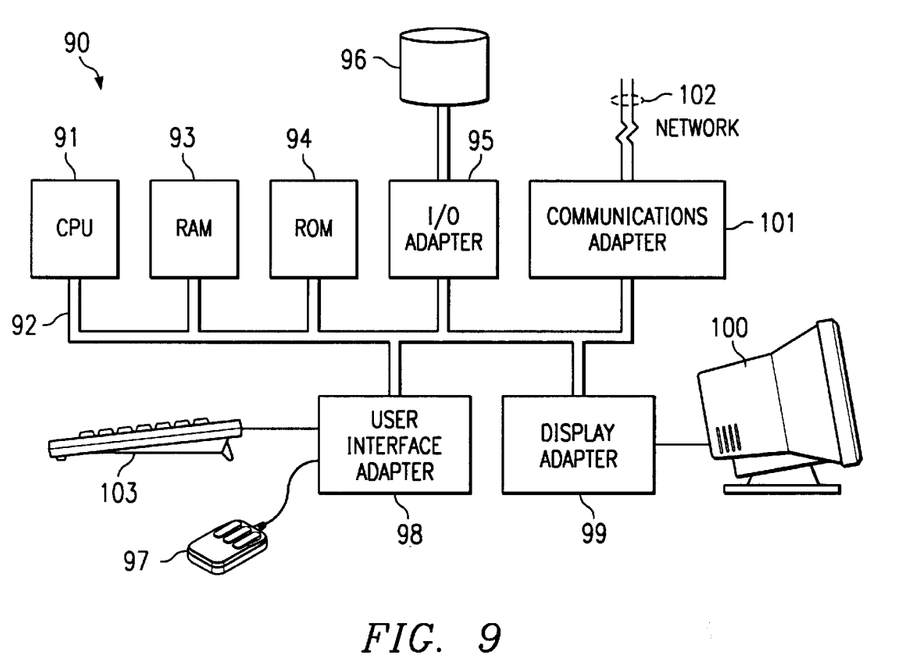
FIG. 9 is a high level block diagram of a computer system adapted to implement the present invention.

FIG. 9 illustrates a computer system 90 adapted to use the present invention. Central processing unit (CPU) 91 is coupled to bus 92. In addition, bus 92 is coupled to random access memory (RAM) 93, read only memory (ROM) 94, input/output (I/O) adapter 95, communications adapter 101, user interface adapter 98, and display adapter 99.

RAM 93 and ROM 94 hold user and system data and programs as is well known in the art. I/O adapter 95 connects storage devices, such as hard drive 96, to the computer system. Communications adaption 101 is adapted to couple the computer system to a local, wide-area, or Internet network 102. User interface adapter 98 couples user input devices, such as keyboard 103 and pointing device 97, to the computer system 90. Finally, display adapter 99 is driven by CPU 91 to control the display on display device 100.

CPU 91 may be any general purpose CPU, such as a HP PA-8200. However, the present invention is not restricted by the architecture of CPU 91 as long as CPU 91 supports the inventive operations as described herein. The HP PA-8200 has a 200 megahertz (MHZ) clock period with a peak speed of 800 million floating-point operations per second (MFLOPS). The processor has the ability to execute two memory operations and two floating-point instructions per clock cycle. The processor has a two megabyte (MB) data cache and a two MB instruction cache. The caches have 32 byte cache lines and are direct mapped. The maximum transfer rate from the data cache to the register file is 3200 MB per second (MB/sec). The processor supports multiple data cache misses from memory. Up to ten outstanding data cache misses are supported at one time. The maximum transfer rate from memory to cache is dependent upon the memory latency. For a system with a 500 nanosecond (ns) latency, 10 requests from memory can request a maximum of 640 MB/sec. Since the maximum bandwidth from memory to cache is much less than the cache to functional unit bandwidth, the number of cache misses should be minimized.

An example of a parallel processing system, which would be able to handle multiple threads, is the Exemplar V-Class server, which incorporates 16 of the PA8200 processors into a cache coherent, uniform memory access system. The processors are connected by a non-blocking crossbar to the memory system. The memory system has 32 banks and each bank is 32 bytes wide. The memory system latency is 509 ns and the memory system has been measured delivering data from memory to a PA8200 cache at 520 MB/s.

Although the present invention and its advantages have been described in detail, it should be understood that various changes, substitutions and alterations can be made herein without departing from the spirit and scope of the invention as defined by the appended claims

What is claimed is:

1. A method for calculating a fast Fourier transform (FFT) on a computer system for input data that is stored into a memory as an array X, wherein the computer system uses a cache during its operation and the input data is oriented into a square format of a plurality of squares; the method comprising the steps of:

(a) transposing the data in each respective square across a diagonal of the respective square such that a datum at location i,j becomes the datum at location j,i;

(b) performing a FFT on the data in each respective square;

(c) transposing the data in each respective square across a diagonal of the respective square such that a datum at location i,j becomes the datum at location j,i;
orienting the data in the squares into a column format of a plurality of one dimensional columns;

(d) multiplying the data of each respective column with a respective column of scaling coefficients of a plurality of columns of scaling coefficients, which are stored in array U in memory, with a result maintained in cache as column vector y;

(e) performing a FFT on the data in each respective column vector y;

(f) transposing the data in each respective column vector y such that a datum at location i,j becomes the datum at location j,i in array X, and orienting the results into the square format; and (g) transposing the data in each respective square across a diagonal of the respective square such that a datum at location i,j becomes the datum at location j,i.

2. The method of claim 1, wherein:
the input data n is formed in to s squares, each square has a size of t×t, such that n=s×$t^2$, wherein n is the size of array X.

3. The method of claim 2, wherein:
n=$2^{2k+p} \times 3^{2l+q} \times 5^{2m+r}$
wherein 0≦p,q,r≦1, and at least one of the powers 2k+p, 2l+q, and 2m+r is greater than one.

4. The method of claim 3, wherein:
a portion of the power greater than one is used for the value of t, and the remaining portion of the power greater than one and the remaining powers are used for the value of s.

5. The method of claim 4, wherein:
t=$X^a$ and s=$X^d \times Y^{2b+e} \times Z^{2c+f}$;
wherein X is base of the power greater than 1, Y and Z are the bases of the remaining powers, 2a+d is the power greater than 1, and 2b+e, 2c+f are the remaining powers.

6. The method of claim 1, wherein step (a) includes the steps of:
loading data for each respective square from array X into cache; and
storing data for each respective square to array X from cache.

7. The method of claim 6, wherein:
step (a) incurs two normalized cache misses.

8. The method of claim 1, wherein:
step (a) is performed parallel, with the data for each square being processed by a different thread.

9. The method of claim 1, wherein step (b) includes the steps of:
loading data for each respective square from array X into cache; and
storing data for each respective square to array X from cache.

10. The method of claim 9, wherein:
step (b) incurs two normalized cache misses.

11. The method of claim 1, wherein:
step (b) is performed parallel, with the data for each square being processed by a different thread.

12. The method of claim 1, wherein step (c) includes the steps of:
loading data for each respective square from array X into cache; and
storing data for each respective square to array X from cache.

13. The method of claim 12, wherein:
step (c) incurs two normalized cache misses.

14. The method of claim 1, wherein:
step (c) is performed parallel, with the data for each square being processed by a different thread.

15. The method of claim 1, wherein step (d) includes the steps of:
loading data for each respective column from array X into cache; and
loading data for each respective column from array U into cache.

16. The method of claim 15, wherein:
step (d) incurs two normalized cache misses.

17. The method of claim 15, wherein:
step (d) is performed parallel, with the data for each column vector y being processed by a different thread.

18. The method of claim 15, wherein step (e) operates on the data from vector y stored in cache.

19. The method of claim 18, wherein:
step (e) incurs zero normalized cache misses.

20. The method of claim 18, wherein:
step (e) is performed parallel, with the data for each column vector y being processed by a different thread.

21. The method of claim 18, wherein step (f) operates on the data from vector y stored in cache, and includes the step of:
storing data for each respective column to array X from cache.

22. The method of claim 21, wherein:
step (f) incurs one normalized cache miss.

23. The method of claim 21, wherein:
step (f) is performed parallel, with the data for each column being processed by a different thread.

24. The method of claim 21, wherein step (g) includes the steps of:
loading data for each respective square from array X into cache; and
storing data for each respective square to array X from cache.

25. The method of claim 24, wherein:
step (g) incurs two normalized cache misses.

26. The method of claim 24, wherein:
step (g) is performed parallel, with the data for each square being processed by a different thread.

27. The method of claim 1, wherein:
steps (a), (b), (c), (d), (e), (f), (g) incur at total of 11 normalized cache misses.

28. A system for calculating a fast Fourier transform (FFT) for input data that is stored into a memory as an array X, wherein the system uses a cache during its operation and the input data is oriented into a square format of a plurality of squares; the system comprising:

first means for transposing the data in each respective square across a diagonal of the respective square such that a datum at location i,j becomes the datum at location j,i;
second means for performing a FFT on the data in each respective square;
third means for transposing the data in each respective square across a diagonal of the respective square such that a datum at location i,j becomes the datum at location j,i;
means for orienting the data in the squares into a column format of a plurality of one dimensional columns;
fourth means for multiplying the data of each respective column with a respective column of scaling coefficients of a plurality of columns of scaling coefficients, which are stored in array U in memory, with a result maintained in cache as column vector y;
fifth means for performing a FFT on the data in each respective column vector y;
sixth means for transposing the data in each respective column vector y such that a datum at location i,j becomes the datum at location j,i in array X, and orienting the results into the square format; and
seventh means for transposing the data in each respective square across a diagonal of the respective square such that a datum at location i,j becomes the datum at location j,i.

29. The system of claim 28, wherein:
the input data n is formed in to s squares, each square has a size of t×t, such that $n=s\times t^2$, wherein n is the size of array X.

30. The system of claim 29, wherein:
$n=2^{2k+p}\times 3^{2l+q}\times 5^{2m+r}$
wherein $0\leq p,q,r\leq 1$, and at least one of the powers 2k+p, 2l+q, and 2m+r is greater than one.

31. The system of claim 30, wherein:
a portion of the power greater than one is used for the value of t, and the remaining portion of the power greater than one and the remaining powers are used for the value of s.

32. The system of claim 31, wherein:
$t=X^a$ and $s=X^d\times Y^{2b+e}\times Z^{2c+f}$;
wherein X is base of the power greater than 1, Y and Z are the bases of the remaining powers, 2a+d is the power greater than 1, and 2b+e, 2c+f are the remaining powers.

33. The system of claim 28, wherein the first means includes:
means for loading data for each respective square from array X into cache; and
means for storing data for each respective square to array X from cache.

34. The system of claim 28, wherein the second means includes
means for loading data for each respective square from array X into cache; and
means for storing data for each respective square to array X from cache.

35. The system of claim 28, wherein the third means includes:
means for loading data for each respective square from array X into cache; and
means for storing data for each respective square to array X from cache.

36. The system of claim 28, wherein the fourth means includes:
    means for loading data for each respective column from array X into cache; and
    means for loading data for each respective column from array U into cache.

37. The system of claim 36, wherein:
    the fifth means operates on the data from vector y stored in cache.

38. The system of claim 37, wherein the sixth means operates on the data from vector y stored in cache, and includes the sixth means includes:
    means for storing data for each respective column to array X from cache.

39. The system of claim 38, wherein the seventh means includes:
    means for loading data for each respective square from array X into cache; and
    means for storing data for each respective square to array X from cache.

40. The system of claim 28, wherein:
    each of the first means, the second means, the third means, and seventh means operates in parallel, with the data for each square being processed by a different thread.

41. The system of claim 28, wherein:
    each of the fourth means, the fifth means, and the sixth means operates in parallel, with the data for each column being processed by a different thread.

42. A computer program product having a computer readable medium having computer program logic recorded thereon for calculating a fast Fourier transform (FFT) for input data that is stored into a memory as an array X on a computer system, wherein the system uses a cache during its operation and the input data is oriented into a square format of a plurality of squares; the computer program product comprising:
    first means for transposing the data in each respective square across a diagonal of the respective square such that a datum at location i,j becomes the datum at location j,i;
    second means for performing a FFT on the data in each respective square;
    third means for transposing the data in each respective square across a diagonal of the respective square such that a datum at location i,j becomes the datum at location j,i;
    means for orienting the data in the squares into a column format of a plurality of one dimensional columns;
    fourth means for multiplying the data of each respective column with a respective column of scaling coefficients of a plurality of columns of scaling coefficients, which are stored in array U in memory, with a result maintained in cache as column vector y;
    fifth means for performing a FFT on the data in each respective column vector y;
    sixth means for transposing the data in each respective column vector y such that a datum at location i,j becomes the datum at location j,i in array X, and orienting the results into the square format; and
    seventh means for transposing the data in each respective square across a diagonal of the respective square such that a datum at location i,j becomes the datum at location j,i.

43. The computer program product of claim 42, wherein the first means includes:
    means for loading data for each respective square from array X into cache; and
    means for storing data for each respective square to array X from cache.

44. The computer program product of claim 42, wherein the second means includes
    means for loading data for each respective square from array X into cache; and
    means for storing data for each respective square to array X from cache.

45. The computer program product of claim 42, wherein the third means includes:
    means for loading data for each respective square from array X into cache; and
    means for storing data for each respective square to array X from cache.

46. The computer program product of claim 42, wherein the fourth means includes:
    means for loading data for each respective column from array X into cache; and
    means for loading data for each respective column from array U into cache.

47. The computer program product of claim 46, wherein:
    the fifth means operates on the data from vector y stored in cache.

48. The computer program product of claim 47, wherein the sixth means operates on the data from vector y stored in cache, and includes the sixth means includes:
    means for storing data for each respective column to array X from cache.

49. The computer program product of claim 42, wherein the seventh means includes:
    means for loading data for each respective square from array X into cache; and
    means for storing data for each respective square to array X from cache.

50. The computer program product of claim 42, wherein:
    each of the first means, the second means, the third means, and seventh means operates in parallel, with the data for each square being processed by a different thread.

51. The computer program product of claim 42, wherein:
    each of the fourth means, the fifth means, and the sixth means operates in parallel, with the data for each column being processed by a different thread.

* * * * *